United States Patent
Wu et al.

(10) Patent No.: US 10,689,488 B2
(45) Date of Patent: Jun. 23, 2020

(54) METHOD FOR PREPARING POLYCARBONATE POLYOL AND COMPOSITION COMPRISING THE POLYCARBONATE POLYOL

(71) Applicant: INDUSTRIAL TECHNOLOGY RESEARCH INSTITUTE, Hsinchu (TW)

(72) Inventors: Hsin-Chung Wu, Hsinchu (TW); Chyi-Ming Leu, Hsinchu (TW); Sheng-Yen Shen, Hsinchu (TW); Jiang-Jen Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/229,008

(22) Filed: Dec. 21, 2018

(65) Prior Publication Data

US 2019/0202981 A1 Jul. 4, 2019

Related U.S. Application Data

(60) Provisional application No. 62/612,775, filed on Jan. 2, 2018.

(30) Foreign Application Priority Data

Nov. 23, 2018 (TW) .............................. 107141883 A

(51) Int. Cl.
| | |
|---|---|
| *C08G 64/30* | (2006.01) |
| *B01J 21/16* | (2006.01) |
| *C01B 33/22* | (2006.01) |
| *C01B 33/32* | (2006.01) |
| *C08K 9/02* | (2006.01) |
| *B82Y 40/00* | (2011.01) |
| *C08G 64/40* | (2006.01) |
| *C08K 3/34* | (2006.01) |

(52) U.S. Cl.
CPC ............ *C08G 64/305* (2013.01); *B01J 21/16* (2013.01); *C01B 33/22* (2013.01); *C01B 33/32* (2013.01); *C08K 9/02* (2013.01); *B82Y 40/00* (2013.01); *C01P 2004/24* (2013.01); *C08G 64/40* (2013.01); *C08K 3/34* (2013.01); *C08K 2201/011* (2013.01)

(58) Field of Classification Search
CPC ........... B01J 37/30; B01J 21/16; B82Y 30/00; B82Y 40/00; C01B 33/22; C01B 33/32; C01P 2004/24; C08G 64/0208; C08G 64/305; C08K 3/34; C08K 9/02; C08K 2201/011; C07C 68/065; C07C 68/96
See application file for complete search history.

(56) References Cited

U.S. PATENT DOCUMENTS

| | | | |
|---|---|---|---|
| 5,498,743 | A | 3/1996 | Shih et al. |
| 9,617,377 | B1 | 4/2017 | Palsule et al. |
| 2002/0039642 | A1 | 4/2002 | Inoue et al. |
| 2005/0080180 | A1* | 4/2005 | Lin .......................... C01B 33/12 524/445 |
| 2006/0293468 | A1* | 12/2006 | Rische ............... C08G 18/0823 525/457 |
| 2007/0167565 | A1* | 7/2007 | Rische ............... C08G 18/0828 524/589 |
| 2009/0018256 | A1* | 1/2009 | Nefzger ................. C08G 18/10 524/538 |
| 2013/0023625 | A1* | 1/2013 | Montgomery ..... C08G 18/0823 524/590 |
| 2017/0122345 | A1 | 5/2017 | Adams et al. |

FOREIGN PATENT DOCUMENTS

| | | |
|---|---|---|
| CN | 101701062 | 5/2010 |
| CN | 104487485 | 4/2018 |
| JP | 2004-175940 | 6/2004 |
| TW | 593480 | 6/2004 |
| TW | 201020028 | 6/2010 |
| TW | 201422665 | 6/2014 |
| TW | 201835154 | 10/2018 |
| WO | 2008/102876 | 8/2008 |
| WO | 2014124967 | 8/2014 |

OTHER PUBLICATIONS

Spirkova, et al. "Novel polycarbonate-based polyurethane elastomers: Composition-property relationship", European Polymer Journal, 2011, pp. 959-972.

Poreba, et al. "Aliphatic polycarbonate-based polyurethane nanostructured materials. The influence of the composition on thermal stability and degradation", Composites: Part B, 58, 2014, pp. 496-501.

Pavlicevic, et al. "The Structure and thermal properties of novel polyurethane/organoclay nanocomposites obtained by pre-polymerization", Composites: Part B, 45, 2013, pp. 232-238.

Pavlicevic, et al. "The influence of montmorillonite and bentonite addition on thermal properties of polyurethanes based on aliphatic polycarbonate diols", Thermochimica Acta, 509, 2010, pp. 73-80.

Taiwanese Office Action for Taiwanese Patent Application No. 107141883 dated Apr. 7, 2020.

\* cited by examiner

*Primary Examiner* — Christopher M Rodd

(74) *Attorney, Agent, or Firm* — Amin, Turocy & Watson, LLP

(57) ABSTRACT

Provided are a method for manufacturing polycarbonate polyol and a composition including the polycarbonate polyol. The composition includes polycarbonate polyol; a plurality of nanoscale silicate platelets having 10,000 to 20,000 (units/per platelet) of metal cations on surfaces thereof, wherein the polycarbonate polyol has a viscosity of from 265 to 1520 cps.

7 Claims, No Drawings

US 10,689,488 B2

METHOD FOR PREPARING POLYCARBONATE POLYOL AND COMPOSITION COMPRISING THE POLYCARBONATE POLYOL

CROSS REFERENCE TO RELATED APPLICATIONS

The present application is based on, and claims priority from, Taiwan Application Serial Number 107141883, filed on Nov. 23, 2018, and U.S. Provisional Application No. 62/612,775, the disclosure of which is hereby incorporated by reference herein in its entirety.

TECHNICAL FIELD

The present disclosure relates to methods for preparing polycarbonate polyols.

BACKGROUND

Polycarbonate polyols are excellent in transparency, heat resistance, and mechanical strength, and are widely used in industries such as electrical and electronic parts, automotive parts, optical recording media, and lenses.

The conventional polycarbonate polyol process, however, is carried out by transesterification of an organic carbonate and a polyol at a specific pressure (1.5 to 100 bars) and temperature (100° C. to 300° C.). Alcohols such as methanol (depending on the type of organic carbonate) and unreacted carbonate are distilled off. In the reaction, a catalyst containing an alkaline earth metal or transition metal is added. The residues of these catalysts affect the product properties of the polycarbonate polyol. Accordingly, the selection and use of catalyst must be carefully evaluated. Therefore, it is necessary to develop a catalyst that can be easily removed in the process, or to develop a catalyst that remains in the product without affecting its properties.

SUMMARY

In the present disclosure, provided is a polycarbonate polyol composition, including polycarbonate polyol and nanoscale silicate platelets having 10,000 to 20,000 (units/per platelet) of metal cations on surfaces thereof, wherein the polycarbonate polyol has a viscosity of from 265 to 1520 cps.

In the present disclosure, also provided is a method for preparing polycarbonate polyol, including the steps of: adding 0.5 to 1.5 wt % of nanoscale silicate platelets having about 10,000 to 20,000 (units/per platelet) of metal cations as a catalyst, based on the total weight of a carbonate compound and a diol compound, on surfaces thereof to a reaction system of the carbonate compound and the diol compound; performing a temperature-rising reaction of the carbonate compound and the diol compound; and performing a depressurized reaction, so as to obtain polycarbonate polyol.

DETAILED DESCRIPTION

The following specific embodiments are provided to illustrate the present disclosure. After reading the disclosure of the present specification, a person ordinarily skilled in the art can easily conceive the advantages and functions thereof.

It is to be understood that the structures, the proportions, the dimensions, and the like in the drawings are merely for the purpose of illustrating the disclosure of the present specification, and are intended to be understood and read by a person ordinarily in the art. They should not be construed as limiting the present disclosure to certain conditions, and therefore, does not have technical significance. Modifications of any structure, changes in the proportional relationship, or adjustments to the dimensions are intended to be included within the scope of the present specification, without departing from the scope of the present specification. In the absence of substantial changes to the technical content, changes or adjustments to their relative relationship are considered to be within the scope of the present disclosure.

In the present disclosure, nanoscale platelets each having specific metal cations on a surface thereof is used as a catalyst, and are added to a transesterification reaction system. By catalysis of the cations on the surface, a polycarbonate polyol is obtained upon the termination of the transesterification reaction system, and the nanoscale silicate platelets are dispersed therein. On one hand, the nanoscale silicate platelets remain in the polycarbonate polyol, and do not adversely affect the polycarbonate polyol. On the other hand, the process of additionally adding inorganic filler particles to improve the physical properties of the material is simplified.

Specifically, the nanoscale silicate platelets of the present disclosure are used as a catalyst for the transesterification reaction of an ester compound (such as carbonate compound) with a diol compound to synthesize polycarbonate polyol having the nanoscale silicate platelets, and thereby forming a polycarbonate polyol composition. By utilizing the high specific surface area characteristic and the cations on the surfaces of the nanoscale silicate platelets, the efficiency of the catalytic reaction can be greatly increased (including the increase of the yield and the viscosity of the synthesized product), such that a synthesized product with a larger molecular weight can be obtained. On one hand, it can be avoided that the residues of the common metal catalysts affect the product properties of the polycarbonate polyol; and on the other hand, since the polycarbonate polyol synthesized by this method has been introduced into an inorganic nanoscale silicate platelet material, when further synthesizing or modifying polyurethanes (PU) and polyesters, the polyurethanes and polyesters containing the nanoscale silicate platelets can be obtained with improved physical properties, without extra additions.

The above carbonate compound can be ethylene carbonate, propylene carbonate, 1,2-butylene carbonate, glycerin 1,2-carbonate, dimethyl carbonate, diethyl carbonate, ethyl methyl carbonate, tert-butyl phenyl carbonate, diphenyl carbonate, dibenzyl carbonate, benzyl phenyl carbonate, guaiacol carbonate, di-2-pyridyl carbonate, 1,3-dioxane-2-one, (R)-(+)-4-(methoxymethyl)-1,3-dioxolan-2-one, (S)-(−)-4-(methoxymethyl)-1,3-dioxolan-2-one, or a combination thereof.

The above diol compound can be ethylene glycol, 1,3-propanediol, 1,4-butanediol, 1,5-pentanediol, 1,6-hexanediol, diethylene glycol, polyethylene glycol, polypropylene diol, polytetrahydrofuran, bisphenol-A, or a combination thereof.

The above nanoscale silicate platelet has a thickness of about 1 to 5 nm, and is geometrically a thin silicate platelet (about 100×100×1 nm$^3$) having a high specific surface area, with the surface area of about 700 to 800 m$^2$/g and approximately 4×10$^{16}$ platelets per gram. Each of the silicate platelet is independent without being stacked with each other, and being able to be stably dispersed in an aqueous solution and an organic solution. Owing to the high specific surface area and the cations on the surface thereof, this nanoscale silicate platelet can be used as a catalyst to catalyze the transesterification of an ester- or carbonate-based compound with a polyol compound for the synthesis of a polymer or an oligomer. In addition, Si—OH of about 100,000 to 300,000 per surface on each of the nanoscale silicate platelets can further increase properties of mechanical, heat-resistant and the like of the polymer or oligomer-derived end material.

The method for preparing nanoscale silicate platelets (NSP) of the present disclosure includes delaminating by reacting an amine-terminated Mannich oligomer (AMO) with natural clay, and performing a chemical extraction step, whereby each piece of clay (i.e., nanoscale silicate platelets) can be independently dispersed in water without being stacked with each other, and is stably dispersed in an aqueous solution.

Next, an appropriate amount of metal salts (for example, $MgCl_2$ and LiCl) may be further added to the nanoscale silicate platelets (mainly as NSP-$Na^+$), and cation exchange is performed with $Na^-$ on the nanoscale silicate platelets, so as to synthesize nanoscale silicate platelets each having specific metal cations on the surface thereof (for example, a nanoscale silicate platelet of NSP-$Mg^{2+}$ and NSP-$Li^+$).

The specific experimental procedure is as follows: NSP-$Na^+$ (100 g, 0.1 wt %, 1 mmol) aqueous phase dispersion is placed in a reaction flask equipped with a mechanical agitation and the condensing apparatus. The mixture is immediately added to metal halide ion salts (1.2 mmol) powder of different valence states after being heated to 80° C., and then vigorously stirred at 80° C. for 1 hour to complete NSP-M (M indicates a metal) ion exchange. The NSP-M dispersion is filtered through a suction funnel and washed with deionized water until no halide ions remain, so as to prepare nanoscale silicate platelets each having specific metal cations on a surface thereof, and with a metal cation content of from 10,000 to 20,000 (units/per platelet).

The above nanoscale silicate platelets each have at least one metal cation on the surface, and the metal cation content is from 10,000 to 20,000 (units/per platelet) on surfaces of the nanoscale silicate platelets. The metal cation can be at least one selected from the group consisting of $Na^+$, $Mg^{2+}$, $Li^+$, $K^-$, $Sn^{2+}$, $Ca^{2+}$, $Yb^{3+}$, $Cs^+$, $Sc^{3+}$, $Y^{3+}$, $La^{3+}$ and $Ce^{4+}$.

In the reaction system, the content of the nanoscale silicate platelet catalyst is in a range of 0.5 to 1.5 wt %, based on the total weight of the carbonate compound and the diol compound.

The metal cation content is measured by an atomic absorption spectrometry method, including the steps of: placing 5 g of a soil sample in a 250 mL Erlenmeyer flask; adding 100 mL of $NH_4OAc$ (1 M $NH_4OAc$, pH=7.0) and shaking the mixture for 20 minutes; then filtering the mixture with a filter paper, followed by washing the soil sample with a $NH_4OAc$ solution; and finally fixing the filtrate to 200 mL. The content of the exchangeable metal cations is determined by Atomic Absorption Spectrophotometry (AA).

In the present disclosure, metal cation-containing nanoscale silicate platelets are utilized to catalyze the transesterification reaction to obtain a product with a high viscosity and yield. After the reaction is completed, the polycarbonate polyol in which the nanoscale silicate platelets are dispersed can be obtained to form a polycarbonate polyol composition. The process is efficiently simplified, and it requires less time period for the process. The viscosity is measured by Fungilab SMART.

In the present disclosure, a method for preparing polycarbonate polyol is also provided. Specifically, the method includes the steps of: adding 0.5 to 1.5 wt % of nanoscale silicate platelets having about 10,000 to 20,000 (units/per platelet) of metal cations on surfaces thereof, based on a total weight of a carbonate compound and a diol compound as a catalyst, to a reaction system containing the carbonate compound and the diol compound, and performing a temperature-rising reaction of the carbonate compound and the diol compound, and performing a depressurized reaction to obtain a polycarbonate polyol. The temperature-rising reaction may adopt a staged temperature-rising reaction, and the depressurized reaction may adopt a staged depressurized reaction.

In the method for preparing polycarbonate polyol (PCPO) disclosed in the present disclosure, polycarbonate polyol having nanoscale silicate platelets can be prepared, so that in a subsequent application, a nanoscale complex material can be produced without an extra addition of an inorganic material. On the other hand, the nanoscale silicate platelets can be further removed by centrifugation to obtain high-purity polycarbonate polyol.

For example, the transesterification reaction of ethylene carbonate and 1,6-hexanediol has a reaction scheme as follows:

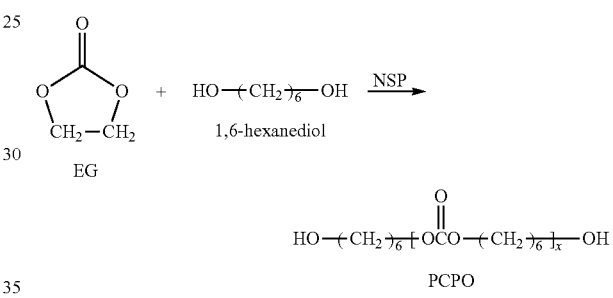

More specifically, in a method for preparing the polycarbonate polyol provided in the present disclosure, the temperature-rising reaction includes from first to third stages; in the first stage, the reaction system is heated, under one atmospheric pressure, to a temperature of 90 to 110° C., and the temperature is maintained for 0.5 to 1 hour; in the second stage, the reaction system is heated, under one atmospheric pressure, to a temperature of from 140 to 160° C., and the temperature is maintained for 1 to 2 hours; and in the third stage, the reaction system is heated, under one atmospheric pressure, to a temperature of from 170 to 190° C., and the temperature is maintained for 4 to 6 hours; and the depressurized reaction includes fourth and fifth stages; in the fourth stage, the reaction system is depressurized to 90 to 110 torr at a temperature of from 170 to 190° C., and the temperature is maintained for 1 to 2 hours to separate by-products; and in the fifth stage, the reaction system is depressurized to equal to or less than 50 torr at a temperature of from 170 to 190° C., and the temperature is maintained for 1 to 2 hours to separate the by-products and the unreacted carbonate compound as well as the unreacted diol.

The present disclosure illustrates details by way of exemplary embodiments. However, the interpretation of the present disclosure should not construed as limiting to the following embodiments.

Example 1

In a reactor equipped with a mechanical stirrer, heating jacket, Dean-Stark Trap, water-cooled condenser and vacuum pump, 1,6-hexanediol (58.66 g; 0.50 mole), ethylene carbonate (41.04 g; 0.47 mole) and 1 g of nanoscale silicate platelets with sodium ions as a catalyst (which was in an amount of 1 wt %), were sequentially added therein; in the first stage, under nitrogen purging and the absolute pressure maintained at 760 torr, the mixture was heated to 100° C. with mechanical stirring (500 rmp) for 0.5 hour; in the second stage, the mixture was heated to 150° C. for 1 hour; and in the third stage, the mixture was heated to 180° C. for 4 hours. Then, in the fourth stage, the reactor was evacuated by a pump at a constant temperature of 180° C., and after the vacuum value was reduced from 760 torr (i.e., 1 atm; 760 mm-Hg) to 100 torr for 1 hour, ethylene glycol (EG) with a lower boiling point (196° C.) was observed to be removed by the Dean-Stark separator. Finally, in the fifth stage, the vacuum value was reduced to 50 torr for one hour to ensure that the by-product ethylene glycol and unreacted ethylene carbonate and 1,6-hexanediol were distilled off, and 70.8 g of polycarbonate polyol (PCPO) having nanoscale silicate platelets can be prepared, which was brown in color and semi-solid at room temperature. The nanoscale silicate platelets were removed by centrifugation to obtain polycarbonate polyol having a viscosity of 1520 cps.

Example 2

The preparation conditions in Example 2 were the same as described in Example 1, except that the catalyst was the nanoscale silicate platelets with sodium ions and the amount was changed to 0.5 wt %. The nanoscale silicate platelets in the polycarbonate polyol were removed by centrifugation to obtain 72.82 g of polycarbonate polyol, which was brown in color and semi-solid at room temperature, with a yield of 72% and a viscosity of 630 cps.

Example 3

The preparation conditions in Example 3 were the same as described in Example 1, except that the catalyst was the nanoscale silicate platelets with sodium ions and the amount was changed to 1.5 wt %. The nanoscale silicate platelets in the polycarbonate polyol were removed by centrifugation to obtain 69.89 g of polycarbonate polyol, which was brown in color and semi-solid at room temperature, with a yield of 69% and a viscosity of 540 cps.

Example 4

The preparation conditions in Example 4 were the same as described in Example 1, except that the catalyst was the nanoscale silicate platelets with magnesium ions. The nanoscale silicate platelets in the polycarbonate polyol were removed by centrifugation to obtain 64.8 g of polycarbonate polyol, which was transparent pale yellow in color and viscous liquid at room temperature, with a yield of 65% and a viscosity of 265 cps.

Comparative Example 1

The preparation conditions of Comparative example 1 were the same as described in Example 1, except that the catalyst was not added therein. In Comparative example 1, 55.8 g of polycarbonate polyol was obtained, which was yellow in color and viscous liquid at room temperature, with a yield of 56% and a viscosity of 225 cps.

Comparative Example 2

The preparation conditions of Comparative example 2 were the same as described in Example 1, except that the catalyst was added in an amount of 3 wt %. In Comparative example 2, 40.9 g of polycarbonate polyol was obtained, which was yellow in color and viscous liquid at room temperature, with a yield of 41% and a viscosity of 160 cps.

Comparative Example 3

The preparation conditions of Comparative example 3 were the same as described in Example 1, except that the catalyst was added in an amount of 5 wt %. In Comparative example 3, 14 g of polycarbonate polyol was obtained, which was yellow in color and viscous liquid at room temperature, with a yield of 14% and a viscosity of 130 cps.

Comparative Example 4

The preparation conditions of Comparative example 4 were the same as described in Example 1, except that the catalyst was the nanoscale silicate platelets with magnesium ions and added in an amount of 3 wt %. In Comparative example 4, the polycarbonate polyol obtained was yellow in color and viscous liquid at room temperature, with a yield of 43% and the viscosity of 135 cps.

Comparative Example 5

The preparation conditions of Comparative example 5 were as described in Example 1, except that the catalyst was the nanoscale silicate platelet with magnesium ion and added in an amount of 5 wt %. In Comparative example 5, the polycarbonate polyol obtained was yellow in color and viscous liquid at room temperature, with a yield of 32% and the viscosity of 190 cps.

The results of the above examples and comparative examples were shown in Table 1.

TABLE 1

| | Catalyst | Added amount of catalyst (wt %) | Viscosity (cps) | Yield (%) |
|---|---|---|---|---|
| Example 1 | NSP with sodium ions | 1 | 1520 | 70 |
| Example 2 | NSP with sodium ions | 0.5 | 630 | 72 |
| Example 3 | NSP with sodium ions | 1.5 | 540 | 69 |
| Example 4 | NSP with magnesium ions | 1 | 265 | 65 |
| Comparative example 1 | N/A | N/A | 225 | 56 |
| Comparative example 2 | NSP with sodium ions | 3 | 160 | 41 |
| Comparative example 3 | NSP with sodium ions | 5 | 130 | 14 |
| Comparative example 4 | NSP with magnesium ions | 3 | 135 | 53 |
| Comparative example 5 | NSP with magnesium ions | 5 | 190 | 32 |

Based on Table 1, the use of a specific amount of nanoscale silicate platelets containing metal cations can greatly increase the viscosity and yield of the product, which meets industrial requirements.

As shown in Table 1, in the present disclosure, polycarbonate polyol comprising nanoscale silicate platelets having 10,000 to 20,000 (units/per platelet) of metal cations on surfaces thereof, wherein the polycarbonate polyol has a viscosity from 265 to 1520 cps is provided. Therefore, when further synthesizing or modifying polyurethanes (PU) and polyesters, the nanoscale silicate platelets are already existent, without extra addition, and the physical properties is improved.

The above embodiments are intended to illustrate the principles of the present disclosure and the effects thereof, and are not intended to limit the present disclosure. Any person skilled in the art can modify the above embodiments without departing from the spirit and scope of the disclosure. Therefore, the scope of protection of the present disclosure should be defined by the appended claims below.

What is claimed is:

1. A polycarbonate polyol composition, comprising:
polycarbonate polyol, and
a plurality of nanoscale silicate platelets having 10,000 to 20,000 (units/per platelet) of metal cations on surfaces thereof,
wherein the polycarbonate polyol has a viscosity from 265 to 1520 cps.

2. The polycarbonate polyol composition of claim 1, wherein the metal cations are each at least one selected from the group consisting of $Na^+$, $Mg^{2+}$, $Li^+$, $K^+$, $Sn^{2+}$, $Ca^{2+}$, $Yb^{3+}$, $Cs^+$, $Sc^{3+}$, $Y^{3+}$, $La^{3+}$, and $Ce^{4+}$.

3. A method for preparing polycarbonate polyol, comprising steps of:
adding 0.5 wt % to 1.5 wt % of nanoscale silicate platelets having 10,000 to 20,000 (units/per platelet) of metal cations on surfaces thereof, based on a total weight of a carbonate compound and a diol compound, to a reaction system of the carbonate compound and the diol compound as a catalyst;
performing a temperature-rising reaction of the carbonate compound and the diol compound; and
performing a depressurized reaction to obtain the polycarbonate polyol.

4. The method of claim 3, wherein the temperature-rising reaction comprises from a first stage to a third stage; in the first stage, the reaction system is heated, under one atmospheric pressure, to a temperature of from 90 to 110° C., and the temperature is maintained for 0.5 to 1 hour; in the second stage, the reaction system is heated, under one atmospheric pressure, to a temperature of from 140 to 160° C., and the temperature is maintained for 1 to 2 hours; and in the third stage, the reaction system is heated, under one atmospheric pressure, to a temperature of from 170° C. to 190° C., and the temperature is maintained for 4 to 6 hours; and the depressurized reaction comprises a fourth stage and a fifth stage; in the fourth stage, the reaction system is depressurized to 90 to 110 torr at temperature of from 170° C. to 190° C., and the temperature is maintained for 1 to 2 hours to separate by-products; and in the fifth stage, the reaction system is depressurized to equal to or less than 50 torr at a temperature of from 170° C. to 190° C., and the temperature is maintained for 1 to 2 hours to separate the by-products and an unreacted carbonate compound and unreacted diol.

5. The method of claim 3, wherein the metal cations are each at least one selected from the group consisting of $Na^+$, $Mg^{2+}$, $Li^+$, $K^+$, $Sn^{2+}$, $Ca^{2+}$, $Yb^{3+}$, $Cs^+$, $Sc^{3+}$, $Y^{3+}$, $La^{3+}$, and $Ce^{4+}$.

6. The method of claim 3, wherein the carbonate compound is ethylene carbonate, propylene carbonate, 1,2-butylene carbonate, glycerin 1,2-carbonate, dimethyl carbonate, diethyl carbonate, ethyl methyl carbonate, tert-butyl phenyl carbonate, diphenyl carbonate, dibenzyl carbonate, benzyl phenyl carbonate, guaiacol carbonate, di-2-pyridyl carbonate, 1,3-dioxane 2-one, (R)-(+)-4-(methoxymethyl)-1,3-dioxolan-2-one, (S)-(−)-4-(methoxymethyl)-1,3-dioxolan-2-one, or a combination thereof.

7. The method of claim 3, wherein the diol compound is ethylene glycol, 1,3-propanediol, 1,4-butanediol, 1,5-pentanediol, 1,6-hexanediol, diethylene glycol, polyethylene glycol, polypropylene diol, polytetrahydrofuran, bisphenol-A, or a combination thereof.

* * * * *